E. A. LARSON.
SECURING DEVICE FOR PINIONS.
APPLICATION FILED APR. 24, 1914.
1,169,408. Patented Jan. 25, 1916
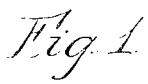
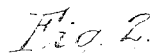
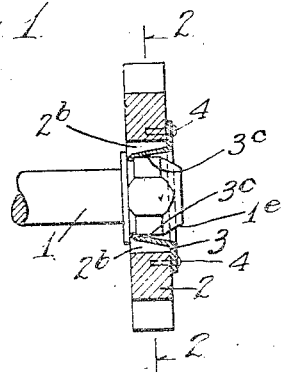
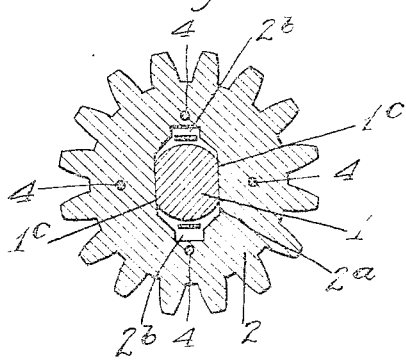
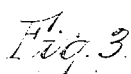
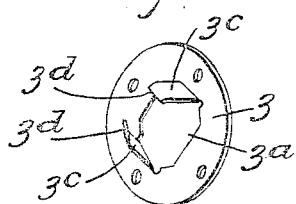
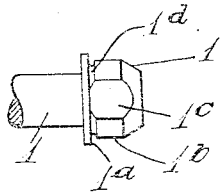
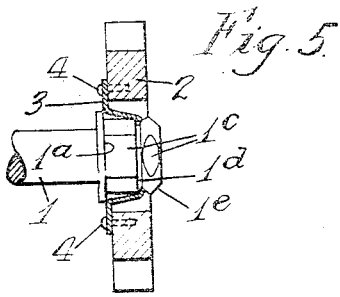
Witnesses:
Inventor:
Edward A. Larson
by Burton & Burton
his Attys.

UNITED STATES PATENT OFFICE.

EDWARD A. LARSON, OF CHICAGO, ILLINOIS, ASSIGNOR TO STEWART-WARNER SPEEDOMETER CORPORATION, OF CHICAGO, ILLINOIS, A CORPORATION OF VIRGINIA.

SECURING DEVICE FOR PINIONS.

1,169,408.

Specification of Letters Patent. Patented Jan. 25, 1916.

Application filed April 24, 1914. Serial No. 834,059.

*To all whom it may concern:*

Be it known that I, EDWARD A. LARSON, a citizen of the United States, residing at Chicago, in the county of Cook and State of Illinois, have invented new and useful Improvements in Securing Devices for Pinions, of which the following is a specification, reference being had to the accompanying drawings, forming a part thereof.

The purpose of this invention is to provide an improved construction of a pinion or other shaft-rotated member, which may be made of any suitable substance, and a mount for the same to which the pinion may be readily applied removably.

It consists in the elements and features of construction shown and described as indicated in the claims.

In the drawings:—Figure 1 is an axial section of a pinion and its mount embodying this invention. Fig. 2 is a section at the line 2—2 on Fig. 1. Fig. 3 is a perspective view of a retaining device which forms part of the pinion. Fig. 4 is a side elevation of the mount or stub axle upon which the pinion is mounted. Fig. 5 is a view similar to Fig. 1 of a modified form.

In the structure shown in the drawings, 1 is a pinion mount or shaft-terminal upon which the pinion in question is to be mounted. It comprises a stop shoulder, 1ª, from which protrudes a non-circular stub axle or shaft terminal, 1ᵇ, the specific form shown being cylindrical with flattened sides, as appearing at 1ᶜ. A groove, 1ᵈ, is formed preferably adjacent the shoulder, 1ª, extending to the depth of the segment cut away in flattening the sides at 1ᶜ. The end of this terminal is conical or tapered, as seen at 1ᵉ. The pinion body, 2, may be understood to be made of fiber or other non-metallic substance, though this is not essential. It is formed with a central opening, 2ª, agreeing in shape and dimensions with the cross section of the stub axle at the plane indicated by the line 2—2 on Fig. 1, with the addition of diametrically opposite notches, 2ᵇ, for accommodating the spring tangs of the retaining device hereinafter described.

3 is the retaining device, which is a sheet metal disk having an aperture, 3ª, corresponding to the aperture in the pinion body, 2, and having a portion of the metal struck out of the aperture folded nearly at right angles to the plane of the disk to form two spring tangs, 3ᶜ, which are positioned for entering the notches, 2ᵇ, of the pinion body, 2, when the member, 3, is applied to said pinion body with its apertures coinciding substantially with the aperture of said body. These tangs have their ends bent inward to form engaging pawls, as shown at 3ᵈ, and the length of the tangs is such that these pawl ends stand with their terminal surfaces substantially flush with the plane of the inner face of the pinion body, 2, when the retaining device, 3, is applied to the outer face of said body, and the tangs are spread for passing over the largest part of the shaft terminal, which causes them to stand a little inward from the plane of said face of the pinion when they are less spread, as they are normally before the pinion is applied to the shaft. The retaining device, 3, may, if preferred, be permanently secured to the pinion body, 2, but when said retaining device is applied, as shown, on the outer side of the pinion, it will retain the latter on the stub axle regardless of the securement or non-securement of said device to the pinion body.

In Fig. 5, there is shown a modification in which the groove, 1ᵈ, is formed immediately back of the tapered end, 1ᵉ, the retaining device being applied upon the inner side of the pinion body. In this form, it is necessary that the retaining device be permanently secured to the pinion body, as by rivets, 4.

It will be seen that in either of the forms illustrated, the pinion with the retaining device may be passed over the tapered end of the stub axle, which will spread the spring tangs as the pinion advances toward the stop shoulder and will snap into the groove when the pinion is at the proper position against the stop shoulder. The groove may have its side facing inward sloped sufficiently to permit the pinion to be forced off the stub axle by applying sufficient pressure, but nevertheless it will be retained securely for all purposes of operation.

I claim:—

1. In combination with a shaft having a noncircular terminal, a device for mounting thereon for rotation thereby consisting of a disk-like body member having a noncircular central aperture adapted to receive the noncircular terminal of the shaft, and a securing device lodged against one face of the body member, and having tangs extending into the aperture of the latter alongside the shaft terminal, and having their ends inturned for engagement with the shaft substantially within the thickness of said body member.

2. In combination with a shaft having a noncircular terminal, a device for mounting on the shaft comprising a disk-like body having a noncircular central aperture adapted to receive the noncircular shaft terminal and be rotatively engaged thereby, and a securing device having a noncircular aperture adapted to be similarly engaged by the shaft terminal, said securing device being lodged on the face of the body member lapping thereon surrounding the aperture, and having tangs extending into said aperture alongside the shaft terminal therein and adapted for engagement with the shaft terminal against longitudinal displacement.

3. A device to be mounted on a shaft for rotation thereby, comprising a body member having a noncircular central aperture and a retaining device of annular form encompassing the aperture on the outer side of the body member, and having tangs extending from the margin of its central aperture into the aperture of said body, the margins of the aperture of the body being notched to accommodate the tangs, the tangs having their ends inturned approximately at the plane of the opposite face of the body member for engagement with the shaft.

4. A device for mounting on a shaft for rotation thereby, comprising a body member having a noncircular central aperture and a retaining device consisting of an annular disk having spring tangs struck out of its aperture and bent to substantially right-angular position with respect to the disk, the ends of the tangs being bent inwardly to form pawl ends for engaging the shaft.

5. In combination with a non-circular shaft, the terminal having a tapered outer end and a groove back of the end, a member to be rotated by the shaft having a noncircular aperture for receiving the shaft terminal and a securing device abutting on the face of said member and comprising a spring tang extending into the aperture of said member and engaging the groove of the shaft.

In testimony whereof, I have hereunto set my hand at Chicago, Illinois, this 21st day of April, 1914.

EDWARD A. LARSON.

Witnesses:
  LUCY I. STONE,
  ROBT. N. BURTON.